United States Patent
Wang et al.

(10) Patent No.: US 11,629,061 B1
(45) Date of Patent: Apr. 18, 2023

(54) METHOD OF MAKING COPPER SULFIDE ELECTRODE MATERIAL

(71) Applicant: Dongguan University of Technology, Guangdong (CN)

(72) Inventors: Gang Wang, Guangdong (CN); Haohong Zhuang, Guangdong (CN); Shiyong Wang, Guangdong (CN); Sihao Lu, Guangdong (CN)

(73) Assignee: Dongguan University of Technology, Guangdong (CN)

( * ) Notice: Subject to any disclaimer, the term of this patent is extended or adjusted under 35 U.S.C. 154(b) by 0 days.

(21) Appl. No.: 17/875,703

(22) Filed: Jul. 28, 2022

(30) Foreign Application Priority Data

Jan. 13, 2022 (CN) .......................... 202210038587.X (51) Int. Cl.
| | |
|---|---|
| *C01G 3/12* | (2006.01) |
| *C02F 1/469* | (2023.01) |
| *C02F 1/461* | (2023.01) |
| *C02F 101/20* | (2006.01) |

(52) U.S. Cl.
CPC .............. *C01G 3/12* (2013.01); *C02F 1/4691* (2013.01); *C02F 1/46114* (2013.01); *C02F 2101/20* (2013.01)

(58) Field of Classification Search
CPC ................................ C02F 1/4691; C01G 3/12
See application file for complete search history.

(56) References Cited

PUBLICATIONS

Translation of CN-110980795-A (Year: 2020).*
Translation of CN-102502775-A (Year: 2012).*

* cited by examiner

*Primary Examiner* — Salil Jain
(74) *Attorney, Agent, or Firm* — Karin L. Williams; Alan D. Kamrath; Mayer & Williams PC (57) ABSTRACT

A method of making copper sulfide electrode material comprising steps of: 1) stirring and dissolving copper(ii) nitrate hydrate ($Cu(NO_3)_2 \cdot 3H_2O$) and Thiourea ($CH_4N_2S$) in a mixed solution consisting of ethylene glycol and deionized water; 2) adding hexadecyl trimethyl ammonium bromide ($C_{19}H_{42}N.Br$) to mixture A; 3) placing the mixture B into a roaster, raising a temperature of the roaster to 100° C. to 180° C. for 10 hours to 18 hours; 4) washing the crude CuS by using a mixed fluid of ethanol absolute ($C_2H_6O$) and deionized water to be cooled in a room temperature, placing the crude CuS in the roaster and raising a temperature of the roaster to 50° C. to 80° C.; 5) producing cathode electrode of asymmetric capacitive deionization module by using the copper sulfide electrode material; 6) producing anode electrode of asymmetric capacitive deionization module by using activated carbon electrode material.

6 Claims, 7 Drawing Sheets

METHOD OF MAKING COPPER SULFIDE ELECTRODE MATERIAL

FIELD OF THE INVENTION

The present invention relates to a copper sulfide electrode material, and more particularly to a method of making copper sulfide electrode material.

BACKGROUND OF THE INVENTION

In recent years, a variety of effective methods for removing copper ions from industrial wastewater have been developed, such as adsorption, chemical precipitation, ion exchange and membrane separation. However, the existing methods have poor removal ability at low concentrations and are prone to secondary pollution. Capacitive deionization is an emerging water treatment technology based on the principle of capacitance, but how to apply it in industrial production not only meets the conditions of simple preparation of electrode materials, wide sources and reusability, but also solves the problem of industrial wastewater containing low concentrations of copper ions. Technical problems such as poor copper removal ability, easy generation of secondary pollution, difficulty in disposal of residual chemicals, high energy consumption, limited ion exchange capacity, low adsorption efficiency, and easy membrane pollution.

The present invention has arisen to mitigate and/or obviate the afore-described disadvantages.

SUMMARY OF THE INVENTION

One aspect of the present invention is to provide a method of making copper sulfide electrode material which is capable of removing copper efficiently at a low cost and avoiding secondary pollution.

To obtain the above aspects, a method of making copper sulfide electrode material provided by the present invention contains steps of:

1) stirring and dissolving copper(ii) nitrate hydrate ($Cu(NO_3)2.3H_2O$) and Thiourea ($CH_4N_2S$) in a mixed solution consisting of ethylene glycol and deionized water, wherein a molar ratio of the $Cu(NO_3)2.3H_2O$ and the $CH_4N_2S$ is 1:2.5, the mixed solution consists of 10 mL ethylene glycol and 30 mL deionized water, thus producing the mixture A;

2) adding hexadecyl trimethyl ammonium bromide ($C_{19}H_{42}N.Br$) with mixture A, wherein a quantity ratio of the $Cu(NO_3)2.3H_2O$, the Thiourea and the $C_{19}H_{42}N.Br$ of the step 1) is 0.483 g $Cu(NO_2)2.3H_2O$:0.380 g:0.380 g $CH_4N_2S$:0.05 g $C_{19}H_{42}N.Br$, a stirring time is 5 minutes to 50 minutes to obtain a mixture B;

3) placing the mixture B into a roaster, raising a temperature of the roaster to 100° C. to 180° C. so that the mixture B reacts in the roaster to produce crude copper sulfide (CuS) after 10 hours to 18 hours;

4) washing the crude CuS by using a mixed fluid of ethanol absolute ($C_2H_6O$) and deionized water to be cooled in a room temperature, placing the crude CuS in the roaster and raising a temperature of the roaster to 50° C. to 80° C. so as to dry the crude CuS after 3 hours to 24 hours, thus producing the copper sulfide electrode material.

The method further contains a step of 5) producing cathode electrode of asymmetric capacitive deionization module by using the copper sulfide electrode material. The copper sulfide electrode material of the step 4) is used as an active substance and the active substance is mixed with conductive carbon black evenly. A quantity ratio of the copper sulfide electrode material and the conductive carbon black is 10:1 to 7:1, the CMO is added to and is stirred with the active substance and the conductive carbon black, and a binder is added to and stirred with the $C_2H_6O$, the active substance and the conductive carbon black. A quantity ratio of the copper sulfide electrode material and the binder is 10:1 to 7:1, and the blinder is a mixed fluid made by a quantity ratio of 6:1 to 2:1 of polyvinyl butyral and polyvinylpyrrolidone. A mixture of the binder, the $C_2H_6O$, the active substance and the conductive carbon black is coated on a graphite paper, and a coating thickness of the mixture of the binder, the $C_2H_6O$, the active substance and the conductive carbon black is 100 μm to 600 μm, and the graphite paper is dried in a temperature of 40° C. to 80° C. for 2 hours to 24 hours, thus producing the active substance which is a cathode electrode for capacitive deionization of copper sulfide.

The method further contains a step of 6) producing anode electrode of asymmetric capacitive deionization module by using activated carbon electrode material.

The method further contains a step of 7) connecting current collector a, first titanium strip b, the cathode electrode c for the capacitive deionization of copper sulfide, non-woven fabric d, silicone gasket e, non-woven fabric d, and the anode electrode c' for the capacitive deionization of activated carbon, a second titanium strip b and a second current collector a are in sequence from left to right to produce an asymmetric capacitive deionization module.

Activated carbon and the conductive carbon black are mixed evenly to produce another active substance, the $C_2H_6O$ is added to and mixed with another active substance, and the binder is added to and stirred with another active substance and the $C_2H_6O$, wherein a quantity ratio of the blinder is a mixed fluid made by a quantity ratio of 2:1 to 6:1 of polyvinyl butyral and polyvinylpyrrolidone.

A mixture of the binder, the $C_2H_6O$, and another active substance is coated on another graphite paper, a coating thickness of the mixture of the binder, the $C_2H_6O$, and the active substance is 100 μm to 600 μm, and another graphite paper is dried in a temperature of 40° C. to 80° C. for 2 hours to 24 hours, thus producing the active substance which is an anode electrode for capacitive deionization of activated carbon.

In the step 7), a copper-containing waste liquid is pumped into a channel between two electrodes by a peristaltic pump, a flow speed of the peristaltic pump is controlled at 10 mL/min, and the asymmetric capacitive deionization module is powered by the peristaltic pump. Under an action of voltage, anions and cations in the solution are adsorbed to the anode electrode and the cathode electrode respectively, and 1 mol/L hydrochloric acid is configured to adjust a pH value of the copper-containing waste liquid 2, and the pH value of the copper-containing waste liquid 2 is controlled within 1.5 to 4.5, a voltage of power supply is set at 0V to 1.4V, and an absorbing time is set 5 min to 360 min, thus extracting copper ions. Preferably, the voltage of power supply is set at 1V, and an absorbing time is set at 180 min.

Thereby, the advantages of the method of the present invention contain:

A) The copper sulfide electrode material of the invention has a wide range of applications, and it is used for the treatment of copper-containing wastewater while extracting copper. The copper sulfide is a Faraday material. Compared with carbon materials, copper sulfide shows high adsorption in the process of copper-containing wastewater treatment. It can overcome the interference of various salt ions and other types of heavy metals in water, and selectively extract copper ions from water.

B) The method of making the copper sulfide has the advantages of simple process, short preparation period, wide source of raw materials, high output, low cost, etc. The copper sulfide material of the present invention is reusable, and the copper sulfide can still maintain a high level after repeated adsorption and desorption adsorption capacity.

BRIEF DESCRIPTION OF THE DRAWINGS

FIG. 4-1 is a schematic view showing the structure of the asymmetric capacitive deionization module according to the preferred embodiment of the present invention.

FIG. 4-2 is a schematic view showing the assembly of the asymmetric capacitive deionization module according to the preferred embodiment of the present invention.

DETAILED DESCRIPTION OF THE PREFERRED EMBODIMENTS

With reference to FIGS. 1-7, a method of making copper sulfide electrode material according to a preferred embodiment of the present invention comprises steps of:

1) taking and adding 0.483 g copper(ii) nitrate hydrate ($Cu(NO_3)2.3H_2O$) and 0.380 g Thiourea ($CH_4N_2S$) based on a quantity ratio to a mixed solution consisting of ethylene glycol and deionized water, stirring the 0.483 g $Cu(NO_3)2.3H_2O$ and the 0.380 g $CH_4N_2S$ with mixed solution to produce a mixture A, wherein the $Cu(NO_3)2.3H_2O$ and the $CH_4N_2S$ are stirred and dissolved in the mixed solution, a molar ratio of the $Cu(NO_3)2.3H_2O$ and the $CH_4N_2S$ is 1:2.5, the mixed solution consists of 10 mL ethylene glycol and 30 mL deionized water, thus producing the mixture A;

2) adding 0.05 g hexadecyl trimethyl ammonium bromide ($C_{19}H_{42}N.Br$) to mixture A based on a quantity ratio to the mixture A, stirring the 0.05 g $C_{19}H_{42}N.Br$ and the mixture A for 10 minutes, transferring the 0.05 g $C_{19}H_{42}N.Br$ and the mixture A to a reactor so as to be reacted, thus producing a mixture B, wherein the 0.05 g $C_{19}H_{42}N.Br$ is added to the mixture A, then the 0.05 g $C_{19}H_{42}N.Br$ is stirred with the mixture A for 5 minutes to 50 minutes to produce the mixture B. wherein the quantity ratio of the $Cu(NO_3)2$-$3H_2O$, the Thiourea and the $C_{19}H_{42}N.Br$ of the step 1) is 0.483 g $Cu(NO_3)2.3H_2O$:0.380 g:0.380 g $CH_4N_2S$:0.05 g $C_{19}H_{42}N.Br$;

3) placing the mixture B into a roaster and raising a temperature of the roaster is 100° C. to 180° C., wherein crude copper sulfide (CuS) produces after the mixture B is in the roaster for 10 hours to 18 hours, and the mixture B is heated to 150° C. and is reacted in the roaster after 15 hours to produce the crude CuS;

4) washing the crude CuS by using a mixed fluid of ethanol absolute ($C_2H_2O$) and deionized water to be cooled in a room temperature, placing the crude CuS in the roaster and raising a temperature of the roaster to 50° C. to 80° C. so as to dry the crude CuS after 3 hours to 24 hours, thus producing the copper sulfide electrode material, wherein the crude CuS is placed in the temperature of 60° C. to be dried for 12 hours to produce the copper sulfide electrode material;

5) producing cathode electrode of asymmetric capacitive deionization module by using the copper sulfide electrode material, wherein the copper sulfide electrode material of the step 4) is used as an active substance and the active substance is mixed with conductive carbon black evenly, wherein a quantity ratio of the copper sulfide electrode material and the conductive carbon black is 10:1 to 7:1, the $C_2H_6O$ is added to and is stirred with the active substance and the conductive carbon black, and a binder is added to and stirred with the $C_2H_6O$, the active substance and the conductive carbon black, wherein a quantity ratio of the copper sulfide electrode material and the binder is 10:1 to 7:1, and a preferred quality quantity ratio of the copper sulfide electrode material and the binder is 8:1, wherein the blinder is a mixed fluid made by a quantity ratio of 6:1 to 2:1 of polyvinyl butyral and polyvinylpyrrolidone; a mixture of the binder, the $C_2HO$, the active substance and the conductive carbon black is coated on a graphite paper, wherein a coating thickness of the mixture of the binder, the $C_2H_6O$, the active substance and the conductive carbon black is 100 μm to 600 μm, and the graphite paper is dried in a temperature of 40° C. to 80° C. for 2 hours to 24 hours, thus producing the active substance which is a cathode electrode for capacitive deionization of copper sulfide;

6) producing anode electrode of asymmetric capacitive deionization module by using activated carbon electrode material, wherein activated carbon and the conductive carbon black are mixed evenly to produce another active substance, the $C_2H_6O$ is added to and mixed with another active substance, and the binder is added to and stirred with another active substance and the $C_2H_6O$, wherein a quantity ratio of the blinder is a mixed fluid made by a quantity ratio of 2:1 to 6:1 of polyvinyl butyral and polyvinylpyrrolidone; a mixture of the binder, the $C_2H_6O$, and another active substance is coated on another graphite paper, wherein a coating thickness of the mixture of the binder, the $C_2H_6O$, and the active substance is 100 μm to 600 μm, and another graphite paper is dried in a temperature of 40° C. to 80° C. for 2 hours to 24 hours, thus producing the active substance which is an anode electrode for capacitive deionization of activated carbon.

Figure 41:
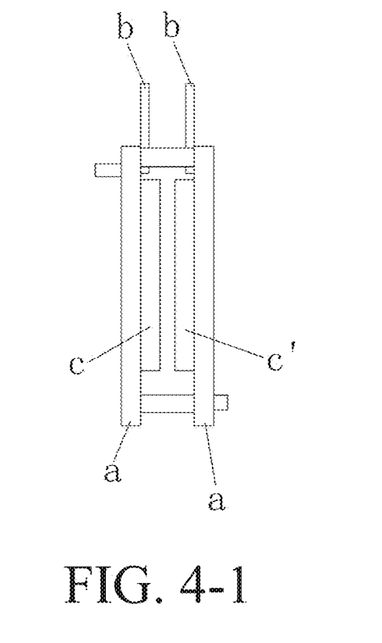
Figure 42:
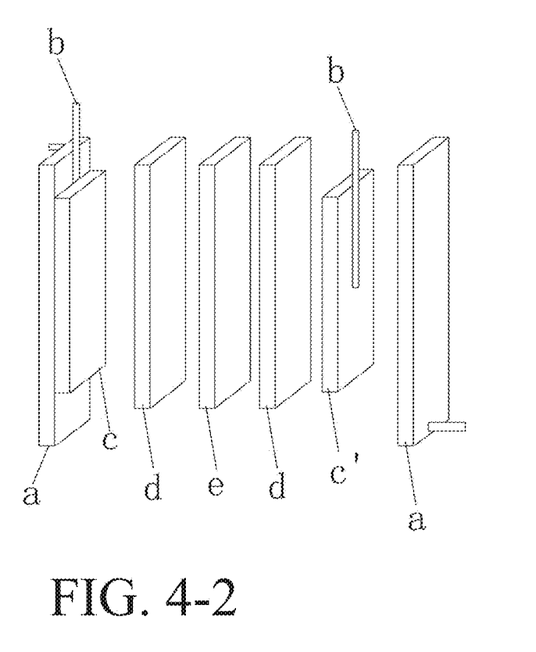

An asymmetric capacitive deionization module is made of copper sulfide electrode material, wherein current collector a, first titanium strip b, the cathode electrode c for the capacitive deionization of copper sulfide, non-woven fabric d, silicone gasket e, non-woven fabric d, and the anode electrode c' for the capacitive deionization of activated carbon, a second titanium strip b and a second current collector a are connected in sequence from left to right to produce the asymmetric capacitive deionization module, as shown in FIGS. 4-1 and 4-2.

Figure 3:
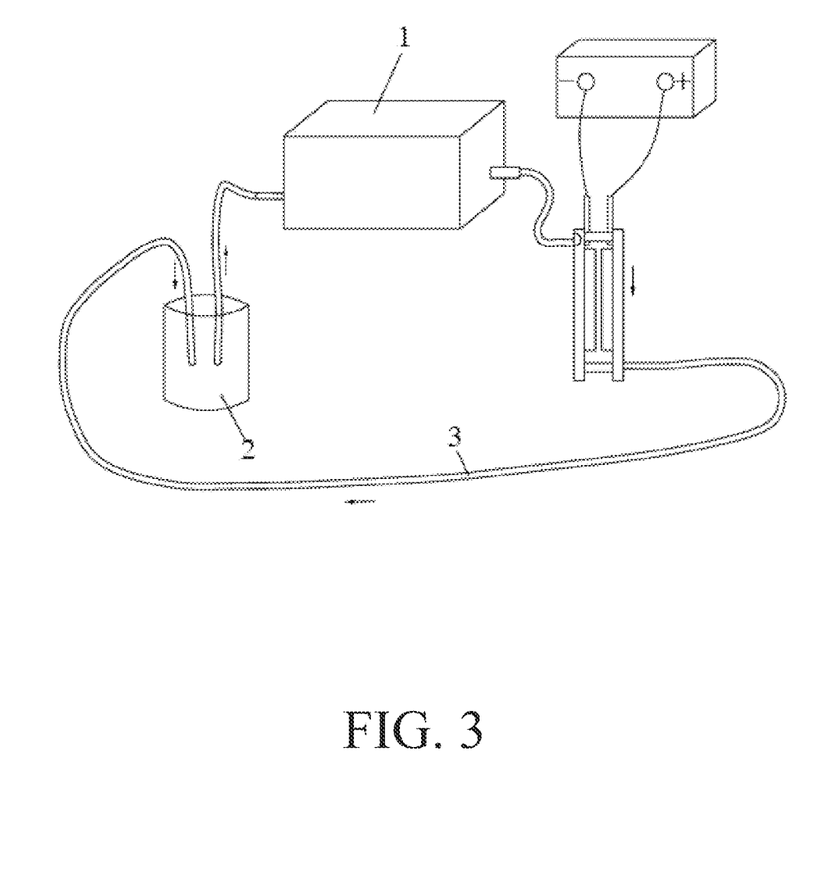
FIG. 3 is a schematic view showing extracting copper ions using an asymmetric capacitive deionization module according to the preferred embodiment of the present invention.

A method for extracting copper ions is executed by using the asymmetric capacitive deionization module, as shown in FIG. 3. A copper-containing waste liquid 2 is pumped into a channel between two electrodes by a peristaltic pump 1, and the asymmetric capacitive deionization module is powered by the peristaltic pump 1. Under an action of voltage, anions and cations in the solution are adsorbed to the anode electrode and the cathode electrode respectively, wherein 1 mol/L hydrochloric acid is configured to adjust a pH value of the copper-containing waste liquid 2, and the pH value of the copper-containing waste liquid 2 is controlled within 1.5 to 4.5, a voltage of power supply is set at 0V to 1.4V, and an absorbing time is set within 5 min to 360 min, thus extracting copper ions.

In a first embodiment, 0.483 g of copper nitrate trihydrate and 0.380 g of thiourea are added to and mixed with a mixed solution of 10 mL of ethylene glycol and 30 mL of deionized water to be dissolved, then 0.05 g of cetyltrimethylammonium bromide is added to and stirred with the mixed solution (to be dissolved) for 10 min to produce the mixed solution. Thereafter, the mixed solution is transferred into the reactor and is put into the roaster to be heated to 150° C., wherein a reacting time of the mixed solution in the reactor is 15 hours. After cooling the mixed solution to the room temperature to produce a solid product, the solid product is washed with absolute ethanol and deionized water. Finally, the solid product is placed in the roaster to be dried at 60° C. for 12 hours, thus obtaining the copper sulfide electrode material.

Figure 1:
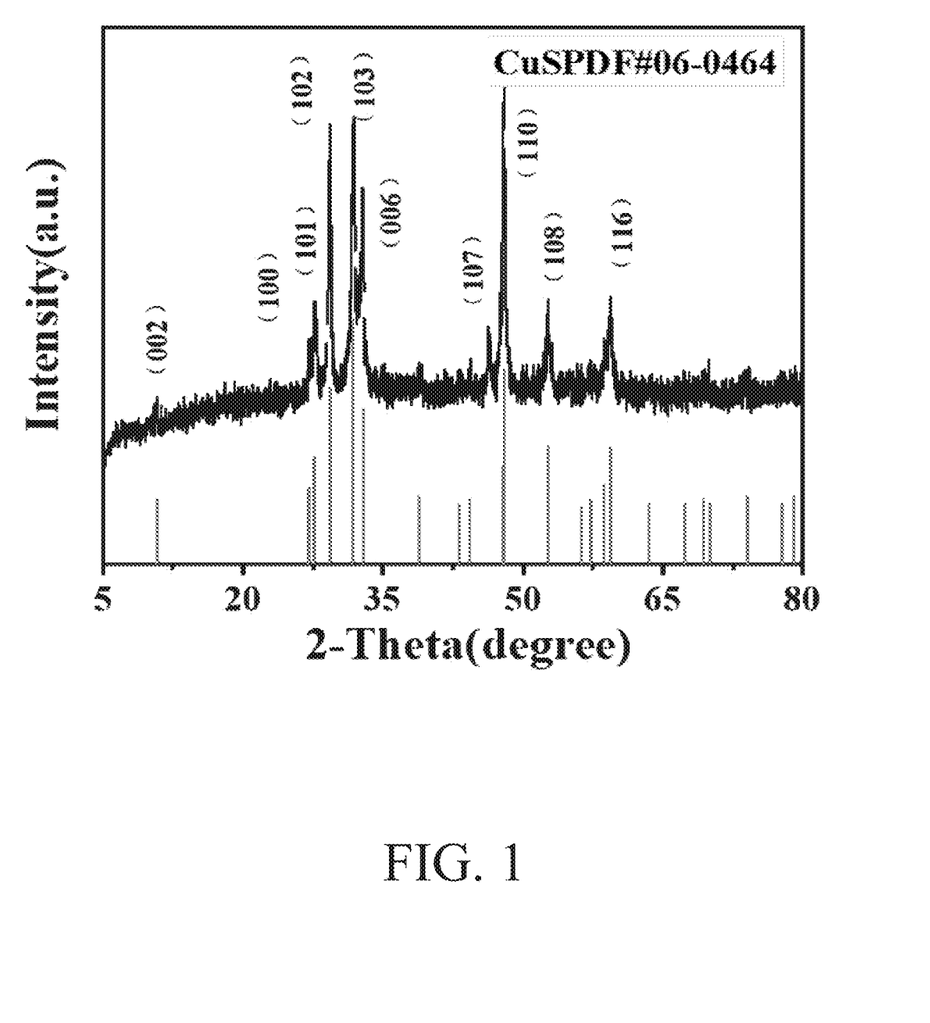
FIG. 1 is a schematic view showing X-ray diffraction spectrum of the copper sulfide electrode material according to a preferred embodiment of the present invention.

FIG. 1 is a schematic view showing X-ray diffraction spectrum of the copper sulfide electrode material according to the first embodiment of the present invention, wherein a more obvious diffraction peak positions are located at 2θ=10.81, 27.12, 27.68, 29.28, 31.78, 32.85, 47.78, 47.94, 52.71 and 59.35° respectively. Compared with the copper sulfide crystal standard card PDF #06-0464, the peak positions correspond to (002), (100), (101), (102), (103), (006), (107) of the copper sulfide crystal, respectively), (110), (108) and (116) planes. Furthermore, there are no other impurity peaks in X-ray diffraction spectrum. The above results show that the copper sulfide electrode material is successfully made in the experiment, and its crystallinity and purity are high.

Figure 2:
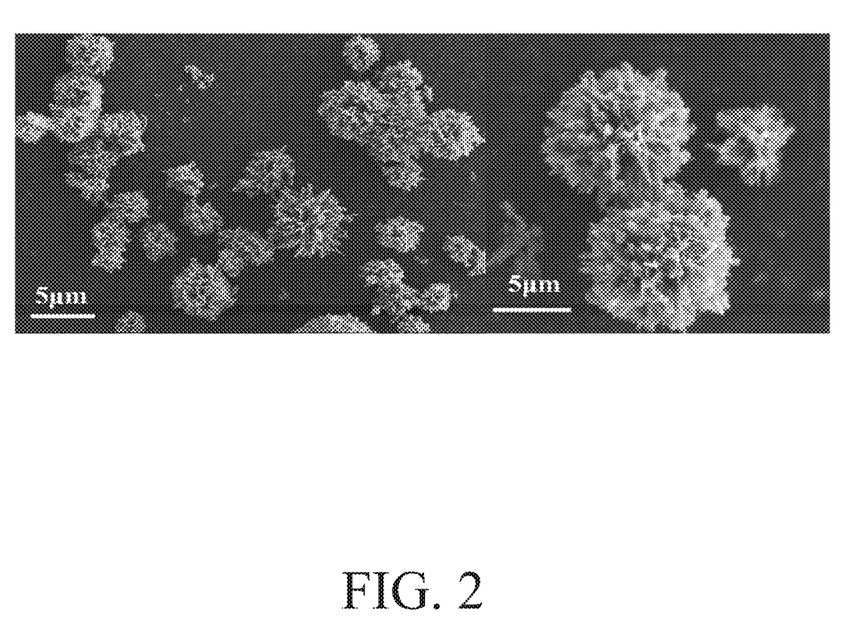
FIG. 2 is a schematic view showing scanning electron microscope of copper sulfide electrode material according to the preferred embodiment of the present invention.

FIG. 2 is a schematic view showing a scanning electron microscope and element distribution map of the copper sulfide material. It can be seen from FIG. 2 that the copper sulfide is a microsphere with a size of 3 microns to 5 microns. In an elemental analysis table 1, a ratio of copper element and sulfur element is close to 1:1, which also illustrates the successful production of the copper sulfide.

TABLE 1

Elemental analysis table of copper sulfide electrode materials
Map Sum Spectrum

| Element | Weight % | Atomic % |
| --- | --- | --- |
| S | 30.27 | 45.21 |
| Cu | 68.89 | 51.91 |
| N | 0.84 | 2.88 |
| Total | 100 | 100 |

In a second embodiment,

The copper sulfide electrode material is used as the active material, and the conductive carbon black is mixed uniformly in a quantity ratio of 8:1, wherein absolute ethanol is added, and after stirring uniformly, the binder is added, wherein a ratio of the active material and the binder is 8:1, and the active material and the binder are stirred well to produce the mixture. Subsequently, the mixture is coated on the graphite paper, wherein a coating of the mixture to the graphite paper is 100 μm to 600 μm. Then, the graphite paper is dried at 50° C. for 10 hours to obtain the cathode electrode for capacitive deionization whose active material is copper sulfide.

Figure 5:
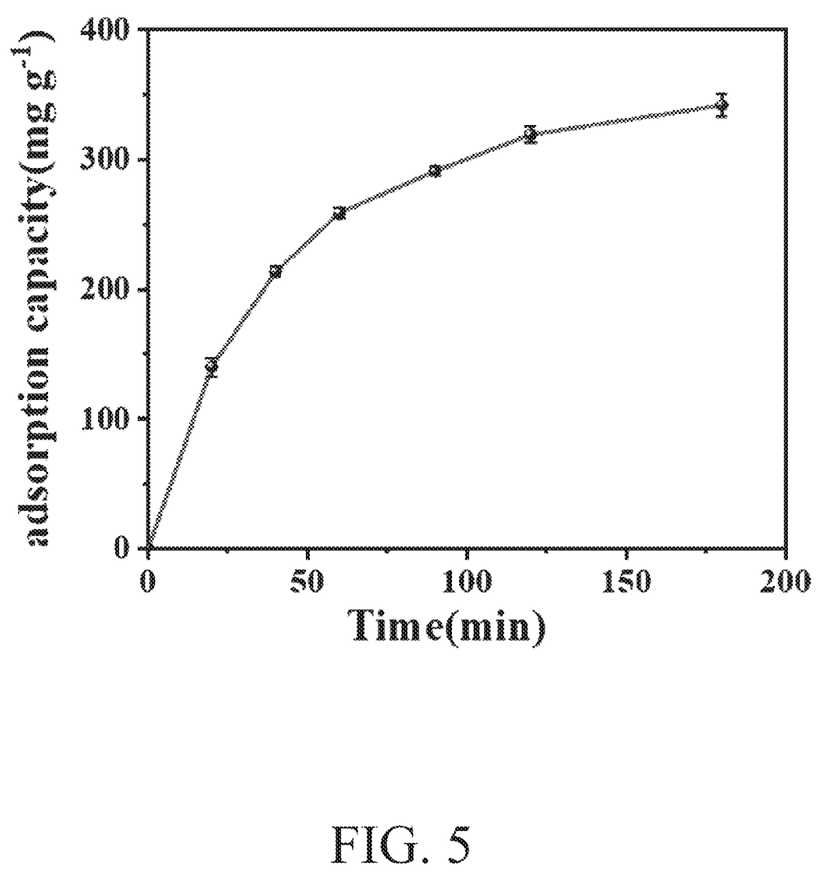
FIG. 5 is a schematic view showing a curve of the adsorption capacity of copper sulfide cathode electrode in the process of electrosorption with time according to the preferred embodiment of the present invention.

In a third embodiment, a copper sulfide electrode material is used for a treatment of copper-containing wastewater, i.e., a method of extracting of the copper comprises steps of:

connecting an assembled asymmetric capacitive deionization module with a power supply, wherein a peristaltic pump 1 and 50 mL of copper-containing wastewater with a copper concentration of 600 mg/L are connected via a hose 3, and the solution containing copper ions is pumped into the channel between the two electrodes at a certain flow rate. Under an action of a voltage of 1V, the absorbing time is 180 min, and the anions and cations in the solution are adsorbed to the two electrodes respectively. As shown in FIG. 5, the copper sulfide cathode electrode is configured tp effectively remove 95% of the copper ions in the copper-containing wastewater, and an adsorption capacity reaches 350.04 mg/g.

A formula for calculating the adsorption capacity is as follows:

$$Q_e = \frac{(C_0 - C_t) \times V}{m}$$

Qe: adsorption capacity; C0: initial concentration;
Ct: equilibrium concentration; V: solution volume;
m: copper sulfide cathode quality.

Figure 6:
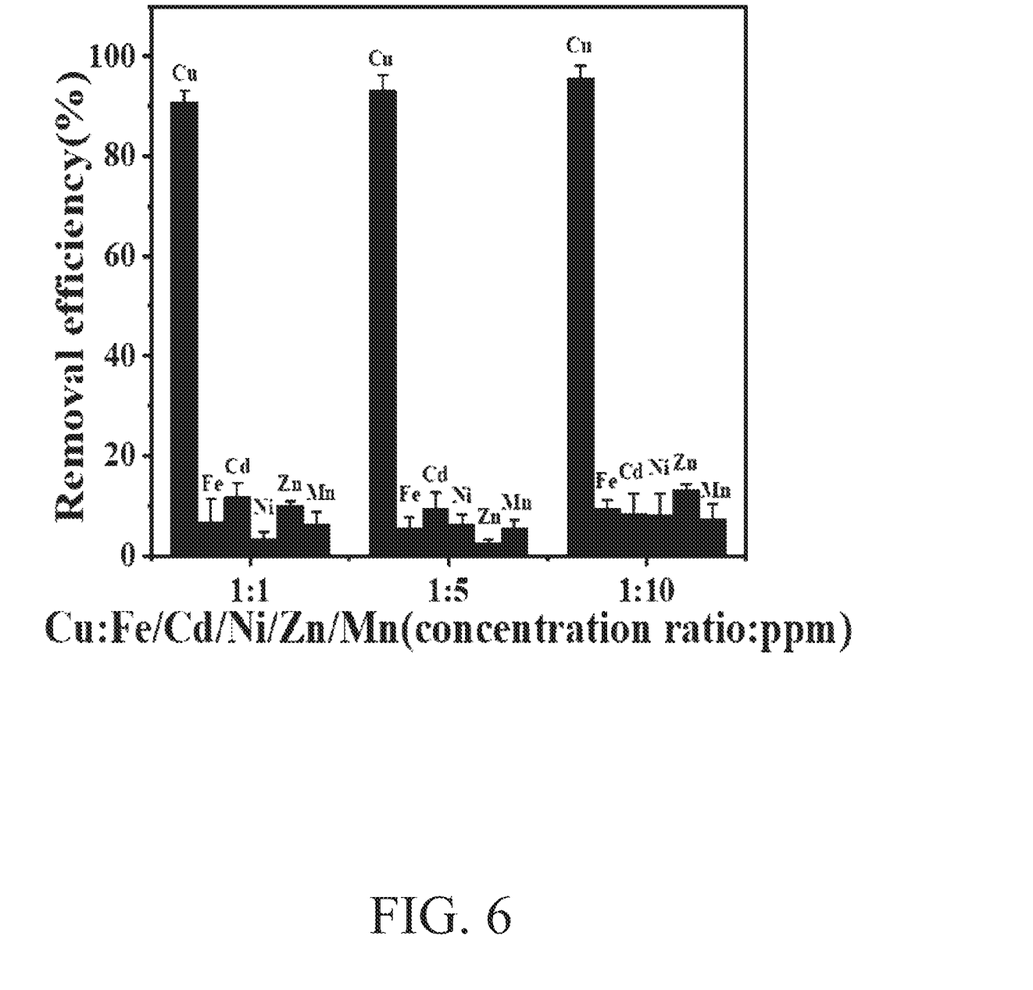
FIG. 6 is a schematic view showing the adsorption of copper and other heavy metals by copper sulfide cathode electrode in wastewater containing multiple components according to the preferred embodiment of the present invention.

The copper sulfide electrode material of the present invention is used to selectively extract copper, and the method is:

The copper sulfide electrode material of the present invention is respectively electro-adsorbed with copper concentration (10 mg/L): three solutions with other heavy metal concentrations of 1:1, 1:5 and 1:10, as shown in FIG. 6. The results show that when a highest concentration ratio is under 1:10, a removal rate of copper sulfide electrode reaches 95%, and a removal rate of other ions is low. The formula for calculating the removal rate is shown as follows:

$$RE = \frac{C_0 - C_t}{C_0}$$

RE: removal efficiency; C0: initial concentration;
Ct: equilibrium concentration.

Figure 7:
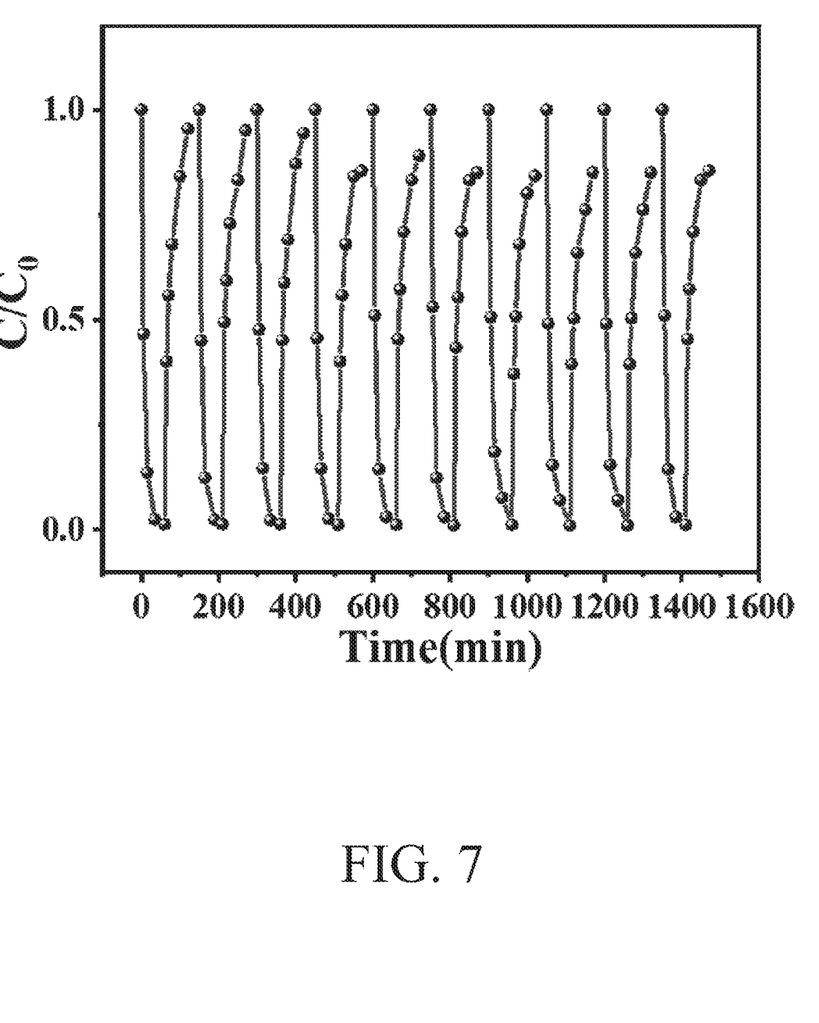
FIG. 7 is a schematic view showing is the adsorption and desorption of copper sulfide cathode electrode in 100 mg/L copper-containing waste liquid according to the preferred embodiment of the present invention.

The adsorption and desorption experiment of the copper sulfide electrode material of the present invention are described as follows:

taking 50 mL of copper-containing wastewater with a copper concentration of 100 mg/L, and using peristaltic pump 1 to draw the copper-containing wastewater into the channel between the two electrodes at a certain flow rate, wherein electro-sorption is executed at a 1V voltage for 60 min. Subsequently, a voltage of −1V is applied for 60 min and so on, wherein above-mentioned description are repeat for 10 loops, and the copper-containing waste water is replaced in each loop. As shown in FIG. 7, after repeating 10 loops, a removal rate of copper reaches 95%, and the desorption energy reaches 85% each time.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A method of making copper sulfide electrode material comprising steps of:
   1) stirring and dissolving copper(ii) nitrate hydrate ($C(NO_3)_2 \cdot 3H_2O$) and Thiourea ($CH_4N_2S$) in a mixed solution consisting of ethylene glycol and deionized water, wherein a molar ratio of the $C(NO_3)_2 \cdot 3H_2O$ and the $CH_4N_2S$ is 1:2.5, the mixed solution consists of 10 mL ethylene glycol and 30 mL deionized water, thus producing a mixture A;
   2) adding hexadecyl trimethyl ammonium bromide ($C_{19}H_{42}N.Br$) to the mixture A, wherein a stirring time of the mixture A and the $C_{19}H_{42}N.Br$ is 5 minutes to 50 minutes to obtain a mixture B;
   3) placing the mixture B into a roaster, raising a temperature of the roaster to 100° C. to 180° C. so that the mixture B reacts in the roaster to produce crude copper sulfide (CuS) after 10 hours to 18 hours;
   4) washing the crude CuS by using a mixed fluid of ethanol absolute ($C_2H_6O$) and deionized water, wherein the crude CuS is cooled in a room temperature and is placed in the roaster, and a temperature of the roaster is raised within 50° C. to 80° C. so as to dry the crude CuS within 3 hours to 24 hours, thus producing the copper sulfide electrode material;
   5) producing cathode electrode of asymmetric capacitive deionization module by using the copper sulfide electrode material;
   6) producing anode electrode of the asymmetric capacitive deionization module by using activated carbon electrode material; and
   7) connecting current collector a, first titanium strip b, the cathode electrode c of copper sulfide, non-woven fabric d, silicone gasket e, non-woven fabric d, and the anode electrode c' of activated carbon, a second titanium strip b and a second current collector a in sequence from left to right to produce the asymmetric capacitive deionization module.

2. The method as claimed in claim 1, wherein in the step 5), the copper sulfide electrode material of the step 4) is an active substance, and the active substance of the copper sulfide electrode material is mixed with conductive carbon black evenly, wherein a quantity ratio of the copper sulfide electrode material and the conductive carbon black is 10:1 to 7:1, the $C_2H_6O$ is added to and is stirred with the active substance of the copper sulfide electrode material and the conductive carbon black, and a binder is added to and stirred with the $C_2H_6O$, the active substance and the conductive carbon black, wherein a quantity ratio of the copper sulfide electrode material and the binder is 10:1 to 7:1, and the binder is a mixed fluid made by a quantity ratio of 6:1 to 2:1 of polyvinyl butyral and polyvinylpyrrolidone;
   wherein a mixture of the binder, the $C_2H_6O$, the active substance of the copper sulfide electrode material and the conductive carbon black are coated on a graphite paper, and a coating thickness of the mixture of the binder, the $C_2H_6O$, the active substance of the copper sulfide electrode material and the conductive carbon black is 100 µm to 600 µm, and the graphite paper on which the mixture of the binder, the $C_2H_6O$, the active substance of the copper sulfide electrode material and the conductive carbon black are coated, is dried in a temperature of 40° C. to 80° C. for 2 hours to 24 hours.

3. The method as claimed in claim 2, wherein a quantity ratio of the copper sulfide electrode material and the binder is 8:1.

4. The method as claimed in claim 1, wherein in the step 6), the $C_2H_6O$ is added to and mixed with a mixture of activated carbon and conductive carbon black, and a binder is added to and stirred with the mixture of activated carbon and conductive carbon black and the $C_2H_6O$, wherein the binder is a mixed fluid made by a quantity ratio of 2:1 to 6:1 of polyvinyl butyral and polyvinylpyrrolidone;
   wherein a mixture of the binder, the $C_2H_6O$, and the mixture of activated carbon and conductive carbon black is coated on a graphite paper, a coating thickness of the mixture of the binder, the $C_2H_6O$, and the active substance is 100 µm to 600 µm, and the graphite paper is dried in a temperature of 40° C. to 80° C. for 2 hours to 24 hours, thus producing a treated material obtained after mixing activated carbon, conductive carbon black, the binder, and $C_2H_6O$ which, and the treaded material is the anode electrode of activated carbon.

5. The method as claimed in claim 4, the step 7) further comprising connecting the asymmetric capacitive deionization module, a peristaltic pump, and a copper-containing waste liquid via a hose, wherein the copper-containing waste liquid is pumped into a channel between the cathode electrode and the anode electrode by the peristaltic pump, the asymmetric capacitive deionization module is powered by the peristaltic pump, under an action of voltage, anions and cations in the solution are adsorbed to the anode electrode and the cathode electrode respectively, and 1 mol/L hydrochloric acid is configured to adjust a pH value of the copper-containing waste liquid, wherein the pH value of the copper-containing waste liquid is controlled within 1.5 to 4.5, a voltage of power supply is set at 0V to 1.4V, and an absorbing time is set 5 min to 360 min, thus extracting copper ions.

6. The method as claimed in claim 5, wherein the flow speed of the peristaltic pump is controlled at 10 mL/min, the voltage of power supply is set at 1V, and an absorbing time is set at 180 min.

* * * * *